No. 699,697. Patented May 13, 1902.
M. L. MISSOTTEN.
CANTEEN.
(Application filed Aug. 31, 1901.)
(No Model.) 2 Sheets—Sheet 1.
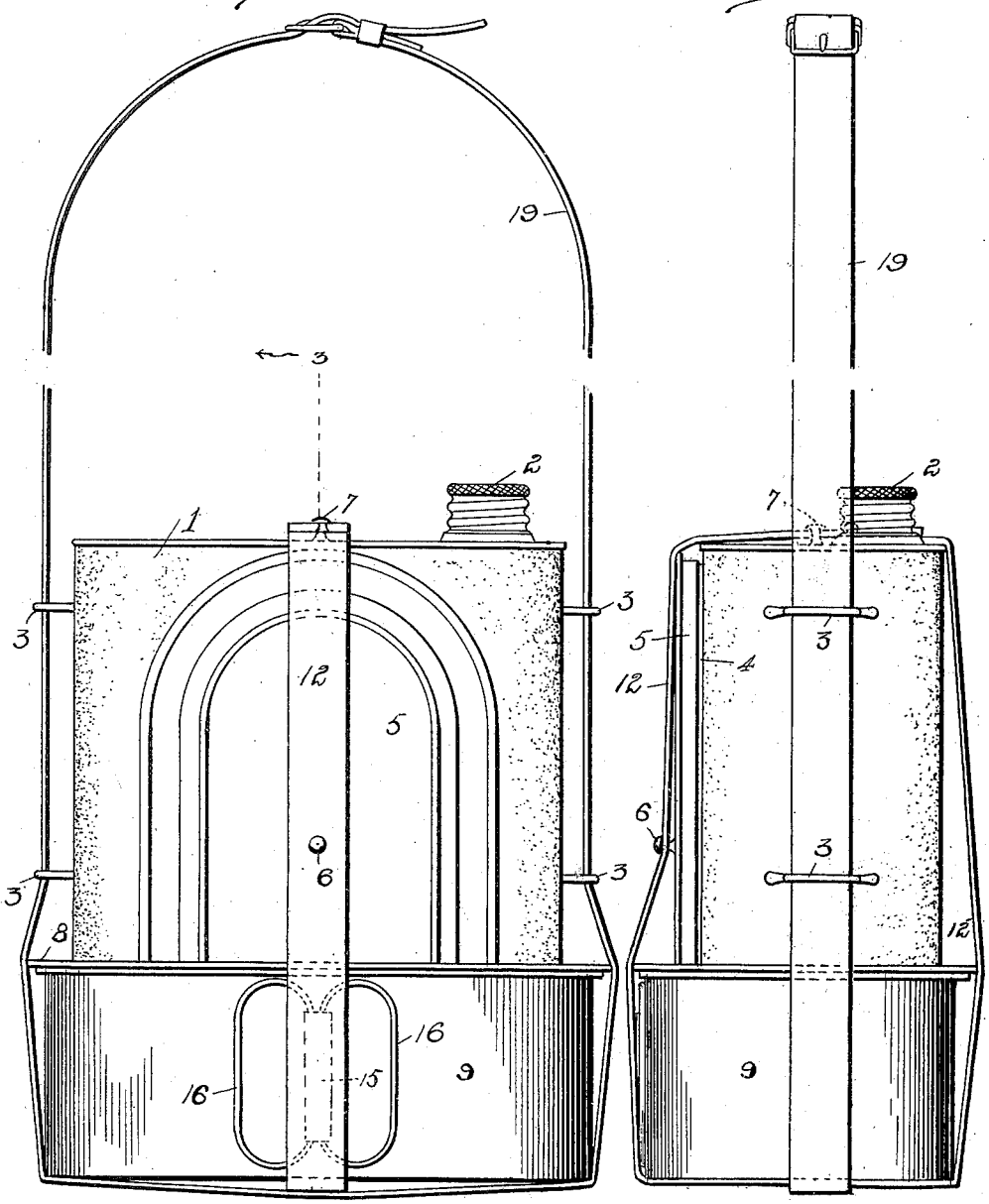
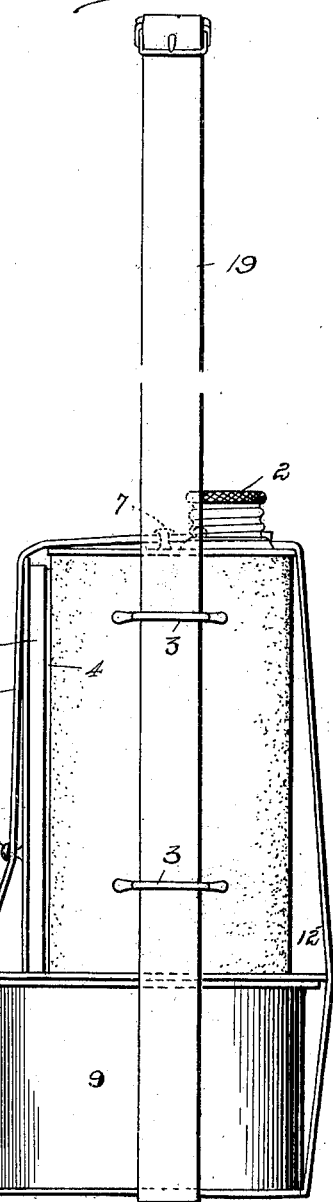

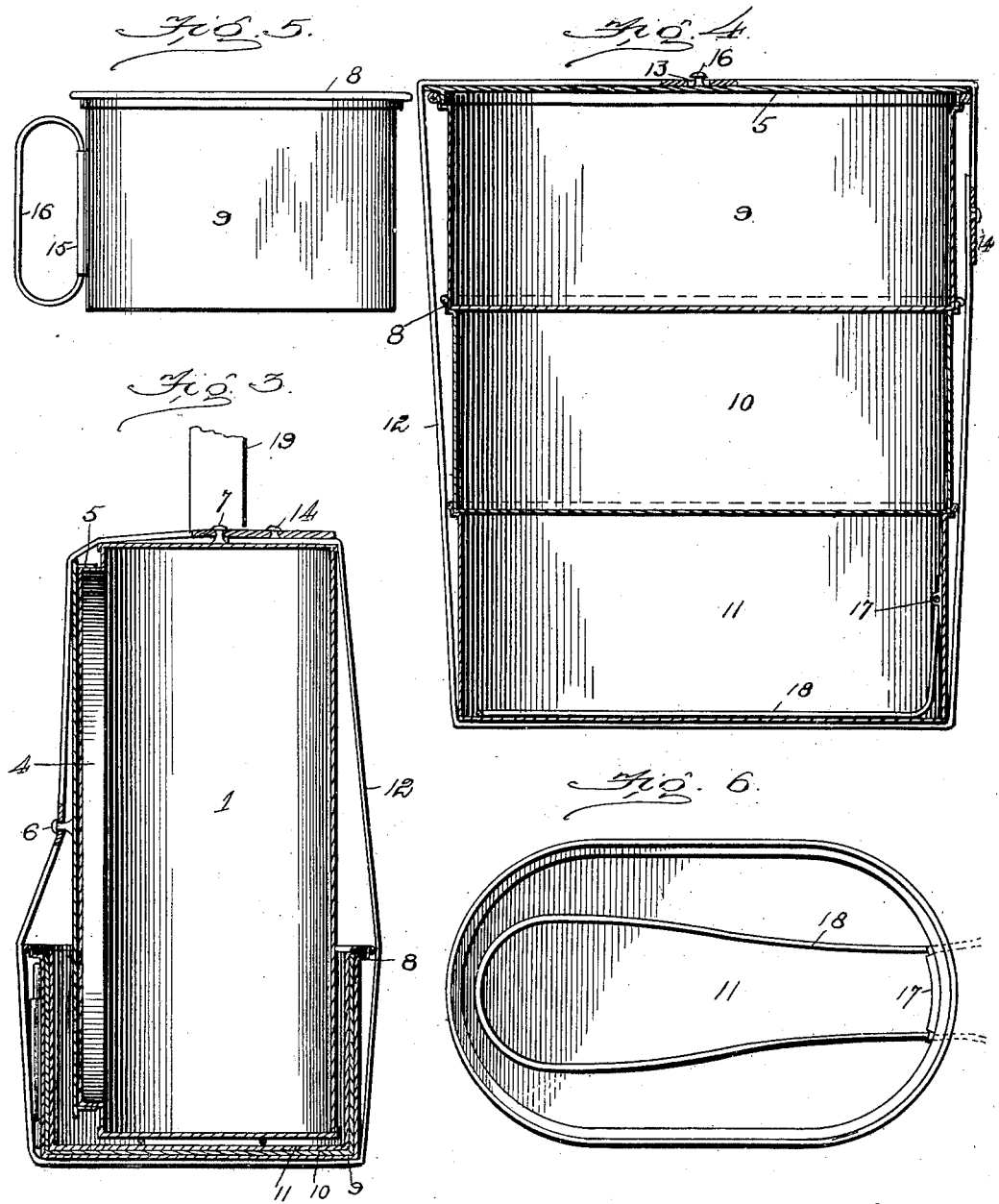

UNITED STATES PATENT OFFICE.

MANUEL LARA MISSOTTEN, OF SALTILLO, MEXICO.

CANTEEN.

SPECIFICATION forming part of Letters Patent No. 699,697, dated May 13, 1902.

Application filed August 31, 1901. Serial No. 74,047. (No model.)

*To all whom it may concern:*

Be it known that I, MANUEL LARA MISSOTTEN, a citizen of Mexico, residing at Saltillo, in the State of Cohahuila, Mexico, have invented certain new and useful Improvements in Canteens, of which the following is a specification, reference being had therein to the accompanying drawings.

My invention relates to new and useful improvements in canteens; and its primary object is to provide a device of this character which is simple and compact in construction, easily carried, and which is provided with detachable parts adapted for use either as cooking utensils or as receptacles for solid foods.

With these and other objects in view the invention consists in the novel construction and combination of parts hereinafter more fully described and claimed, and illustrated in the accompanying drawings, showing the preferred form of my invention, and in which—

Figure 1 is a side elevation of a complete canteen. Fig. 2 is an end view thereof. Fig. 3 is a vertical transverse section. Fig. 4 is a similar view through the utensils arranged for carrying food. Fig. 5 is an elevation thereof in position one within the other, and Fig. 6 is a plan view.

Referring to the figures by numerals of reference, 1 is the liquid-receptacle of the canteen and is substantially oval in plan view. An outlet having a suitable cap or stopper 2 is arranged at the top of the canteen, and a pair of eyes 3 extend from each end of the device. A raised oval-shaped portion 4 is formed upon one side face of the canteen, and this is adapted to hold a lid 5, which is normally fitted thereon and which is provided with a knob or button 6, extending from the center. A knob extends upward from the center of the top of the canteen and is for the purpose hereinafter more fully described. This knob has been numbered 7.

A set of pans or receptacles is used in connection with the canteen proper, 1, and these are so constructed that they may be used either as cooking utensils or as receptacles for carrying food. Preferably three pans of different sizes are employed. They are exactly similar in form, and each is provided at its upper edge with an angular flange 8. The three pans are adapted when not in use to nest snugly one within the other. When, however, it is desired to use them as receptacles for food, the bottom of the largest pan 9 is fitted in the flange 8 of the intermediate pan 10. The flange of the smallest pan 11 receives the bottom of pan 10. Cover 5 is then removed from the side of the canteen 1 and is placed in position on the flange of the top pan 9. A strap 12 is placed around the pans when in this position, an eye 13 therein receiving the button or knob 6 of the cover. A similar button 14 is arranged at one end of the strap and is adapted to project into an eye formed adjacent to the other end thereof.

An ear 15 is formed on the outer face of the large pan 9, and pivoted therein are two loops 16. These serve as handles when it is desired to employ said pan as a cup, &c. The smallest pan 11 is provided with an ear 17 on the inner face of one of its ends. One end of a wire loop 18 is pivoted therein. This loop is L-shaped in side elevation and is adapted to normally rest upon the bottom of the pan. When swung upward and outward, however, it serves as a handle. The pan may then be used as a saucepan.

When the pans are arranged as above described and as illustrated in Fig. 4, they may, if desired, be inclosed in a suitable sack, (not shown,) which will serve to keep heat from the contents. When, however, they are not used as food-receptacles, they are nested one within the other, the lid is placed on the oval 4, and the canteen 1 is placed within the upper pan 11. Strap 12 is then placed around the whole, the eyes therein engaging knobs 6, 7, and 14. A second strap 19 passes through the eyes 3 and under the pans 9, 10, and 11. This strap is adapted to go over the shoulder of the wearer and may be of any desired length.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

The canteen 1 is preferably provided with a cloth covering adapted to protect the contents from the heat.

Having thus fully described my invention, what I therefore claim as new, and desire to secure by Letters Patent, is—

1. The combination with a pan, of a canteen adapted to rest therein, a raised portion upon one face of the canteen, and a cover for the pan adapted to fit upon said raised portion.

2. The combination with a pan, of a canteen adapted to rest therein, a raised portion upon one face of the canteen, a cover for the pan adapted to fit upon said raised portion, a button upon the cover and upon the canteen, and a strap adapted to extend around the pan and canteen and engage the buttons.

3. The combination with a canteen having a raised portion upon one face; of a series of pans of different sizes adapted to nest one within the other, flanges, angular in section, at the edges of the pans, the flange of one pan being adapted to receive the bottom of the next largest, a lid or cover for the pans adapted to fit upon the raised portion of the canteen, and means for securing the canteen and nested pans, together.

4. A device of the character described comprising a series of pans of different sizes adapted to nest one within the other, angular flanges at the edges of the pans, the flange of one pan being adapted to receive the bottom of the next largest pan, a canteen adapted to rest within the nested pans, a raised portion upon one face of the canteen, a lid adapted to fit either upon said raised portion or upon a pan, a strap for securing the pans and canteen together, and a carrying-strap extending under the pans.

In testimony whereof I affix my signature in presence of two witnesses.

MANUEL LARA MISSOTTEN.

Witnesses:
N. A. FUESSLE,
E. H. JEFFRIES.